(12) United States Patent
Viault et al.

(10) Patent No.: US 10,024,201 B2
(45) Date of Patent: Jul. 17, 2018

(54) CAM FOLLOWER ROLLER DEVICE WITH SPACER

(71) Applicants: Samuel Viault, Saint-Antoine-du-Rocher (FR); Benoît Hauvespre, Saint Etienne de Chigny (FR); Thomas Perrotin, Saint Roch (FR)

(72) Inventors: Samuel Viault, Saint-Antoine-du-Rocher (FR); Benoît Hauvespre, Saint Etienne de Chigny (FR); Thomas Perrotin, Saint Roch (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/344,075

(22) Filed: Nov. 4, 2016

(65) Prior Publication Data

US 2017/0145867 A1    May 25, 2017

(30) Foreign Application Priority Data

Nov. 24, 2015 (EP) ..................................... 15306856

(51) Int. Cl.
*F01L 1/14* (2006.01)
*F16H 53/06* (2006.01)

(52) U.S. Cl.
CPC ................. *F01L 1/14* (2013.01); *F01L 1/146* (2013.01); *F16H 53/06* (2013.01); *F01L 2101/00* (2013.01); *F01L 2105/02* (2013.01); *F01L 2107/00* (2013.01)

(58) Field of Classification Search
CPC ... F01L 1/14; F01L 1/143; F01L 1/146; F01L 1/16; F01L 2101/00; F01L 2105/02; F01L 2107/00; F02M 59/102; F02M 59/44; B23Q 5/342; F16H 53/06
See application file for complete search history.

(56) References Cited

U.S. PATENT DOCUMENTS

| | | | | |
|---|---|---|---|---|
| 9,528,397 | B2* | 12/2016 | Berruet | F02M 59/102 |
| 9,541,184 | B2* | 1/2017 | Champalou | F01L 1/14 |
| 9,644,729 | B2* | 5/2017 | Berruet | F02M 59/102 |
| 9,752,670 | B2* | 9/2017 | Berruet | F16H 53/06 |
| 9,790,818 | B2* | 10/2017 | Berruet | F01L 1/18 |
| 2014/0150602 | A1 | 6/2014 | Hauvespre et al. | |
| 2015/0082938 | A1* | 3/2015 | Schick | F01L 1/14 74/569 |
| 2016/0312665 | A1* | 10/2016 | Jouanno | F02M 59/102 |

(Continued)

FOREIGN PATENT DOCUMENTS

DE    102006057246 A1    6/2008
EP        2853738 A1    4/2015
(Continued)

*Primary Examiner* — Adam D Rogers
(74) *Attorney, Agent, or Firm* — Bryan Peckjian; SKF USA Inc. Patent Dept.

(57) ABSTRACT

The cam follower roller device provides a tappet body extending along an axis, an insert mounted in the tappet body, a pin mounted at least on the insert and a roller mounted on the pin. The device further provides a spacer having a body mounted axially against the insert and with retaining means, cooperating with the insert for fixing the spacer to the insert.

10 Claims, 5 Drawing Sheets

(56) References Cited

U.S. PATENT DOCUMENTS

| | | | | |
|---|---|---|---|---|
| 2017/0130616 A1* | 5/2017 | Viault | .................. | F02M 59/102 |
| 2017/0145868 A1* | 5/2017 | Viault | ........................ | F01L 1/14 |
| 2017/0145869 A1* | 5/2017 | Corbett | ..................... | F01L 1/14 |
| 2017/0145877 A1* | 5/2017 | Hauvespre | ................. | F01L 1/14 |
| 2017/0159507 A1* | 6/2017 | Viault | ........................ | F01L 1/14 |
| 2017/0299037 A1* | 10/2017 | Abrahamson | ........... | F16H 53/06 |

FOREIGN PATENT DOCUMENTS

| | | | | | |
|---|---|---|---|---|---|
| EP | | 3121436 A1 * | 1/2017 | ........... | F02M 59/102 |
| EP | | 3176393 A1 * | 6/2017 | | |
| EP | | 3181837 A1 * | 6/2017 | ........... | F02M 59/102 |
| JP | | H05288015 A | 11/1993 | | |

* cited by examiner

CAM FOLLOWER ROLLER DEVICE WITH SPACER

CROSS REFERENCE TO RELATED APPLICATIONS

This application claims priority to European patent application no. 15306856.4 filed on Nov. 24, 2015, the contents of which are fully incorporated herein by reference.

FIELD OF THE INVENTION

The present invention relates to the field of cam follower roller devices used in automotive or industrial applications.

One advantageous application of the invention is the use of the cam follower roller device in a fuel injection pump intended for an internal combustion engine, in particular of a motor vehicle. Another advantageous application of the invention is the use of the device in a rocker system intended for controlling valves of an internal combustion piston engine.

BACKGROUND OF THE INVENTION

Such a cam follower roller device generally provides an outer tappet body, a pin mounted on the tappet body and a roller movable in rotation relative to the pin around its axis. When the cam follower roller device is in service in a fuel injection pump, the roller collaborates with a cam synchronized with the internal combustion engine camshaft or crankshaft. The rotation of the camshaft, or crankshaft, leads to a periodic displacement of a piston of the pump that rests against the tappet body, to allow fuel to be delivered.

It is also known to provide the cam follower roller device with an insert as a stroke-transmission part mounted in the tappet body. EP-A1-2 853 738 describes a device comprising such an insert supporting the pin while the tappet body supports the insert.

Such a cam follower roller device is generally delivered as a pre-assembled s unit to a motor vehicle manufacturer or system supplier. The axial length of the device may be adapted according to the application and the specification of the manufacturers or system suppliers. It is known to design a forged tappet body with adapted given dimensions for each application and for each manufacturer or system supplier.

BRIEF SUMMARY OF THE INVENTION

One aim of the present invention is to provide a unitary cam follower roller device with an adaptive and cost-saving design.

In one embodiment, the cam follower roller device provides a tappet body extending along an axis, an insert mounted in the tappet body, a pin mounted at least on the insert, and a roller mounted on the pin.

The device further provides a spacer provided with a body mounted axially against the insert and with retaining means cooperating with the insert for fixing the spacer to the insert. Alternatively, the retaining means may cooperate with the tappet body for fixing the spacer to body.

Accordingly, the tappet body as well as the insert can have a standardized design for each application and for each manufacturer or system supplier. The length of the spacer is the only feature of the device to be adapted for the different applications and manufacturers or system suppliers. This leads to a reduction of the manufacturing costs. With a spacer provided with retaining means, the cam follower roller device constitutes a unitary assembly that can be handled and transported.

With such a device comprising the tappet body and the spacer separate from one another, the density of the material of the body of the spacer may advantageously be smaller than that of the material of the tappet body. Accordingly, the weight of the device can be limited.

Preferably, the body of the spacer is mounted axially against the insert on the side opposite to the pin and the roller. The spacer may axially protrude outwards with respect to the tappet body.

In one embodiment, the body of the spacer provides an abutment surface mounted axially against the insert, the retaining means axially protruding with respect to the abutment surface. Each retaining means may provide a lug provided with a hook axially disposed on the side opposite to the abutment surface with respect to the insert. The hook may be obtained by plastic deformation.

In another embodiment, the retaining means of the spacer are formed on an outer surface of the body. The retaining means may provide an outer thread cooperating with an inner thread formed on an inner surface of the tappet body.

The body and the retaining means may be formed in one part.

In one embodiment, the device further provides a washer secured into the tappet body and mounted axially against the insert on the side opposite to the pin and the roller. Advantageously, the washer may be an elastic washer.

In one embodiment, the insert provides a central core and at least two side tabs each comprising a receiving housing into which is mounted an end of the pin. The body of the spacer may be mounted into axial contact with the central core of the insert.

In one embodiment, the tappet body provides axial blocking means for maintaining the pin into the receiving housings.

BRIEF DESCRIPTION OF THE SEVERAL VIEWS OF THE DRAWING

The present invention and its advantages will be better understood by studying the detailed description of specific embodiments given by way of non-limiting examples and illustrated by the appended drawings on which.

DETAILED DESCRIPTION OF THE INVENTION

Figure 1:
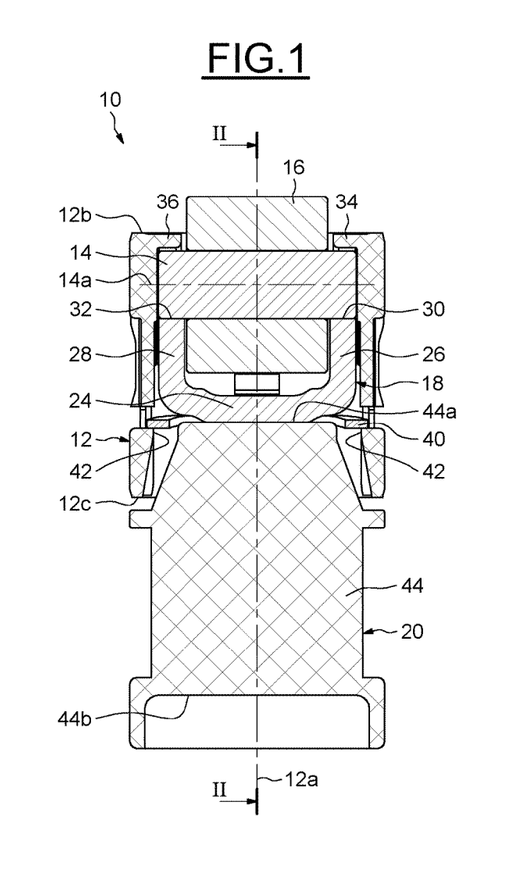
FIG. 1 is a cross-section of a cam follower roller device according to a first example of the invention.
Figure 2:
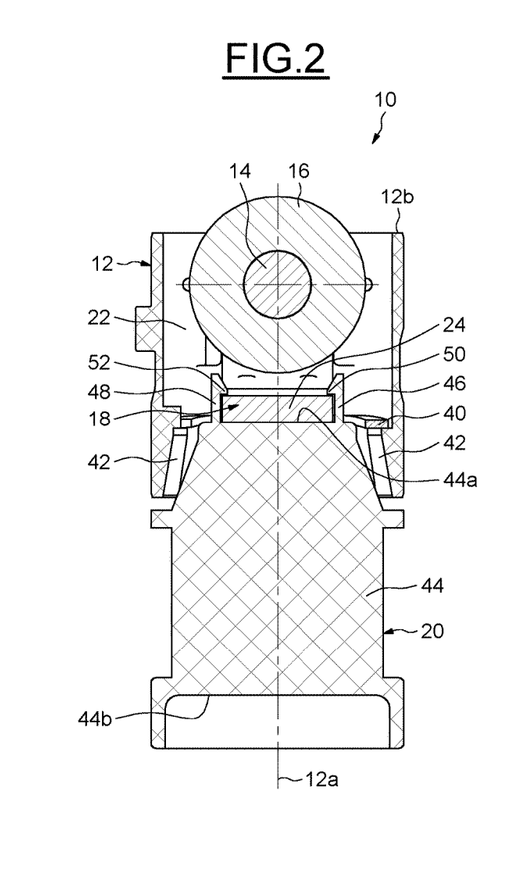
FIG. 2 is a section on II-II of FIG. 1.
Figure 3:
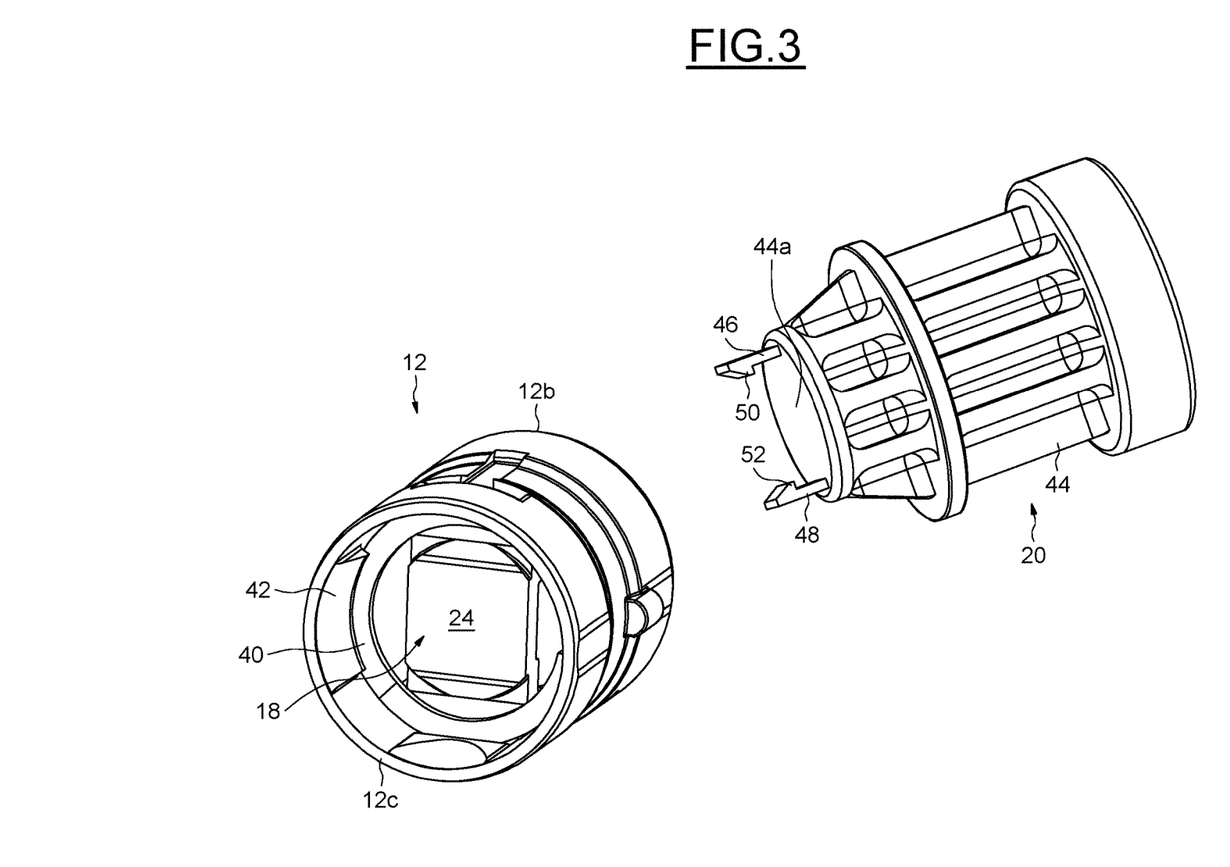
FIG. 3 is an exploded perspective view of the device of FIG. 1.

As shown on FIGS. 1 to 3, a cam follower roller device 10 provides an outer tappet housing or body 12 extending along an axis 12a, a shaft or pin 14 extending along an axis 14a perpendicular to the axis 12a, a roller 16 mounted on the pin and movable in rotation relative to the pin, and a stroke-transmission part or insert 18 mounted in the tappet body. The insert 18 supports the pin 14 while the tappet body 12 supports the insert. As will be described later, the device 10 further provides a spacer 20 mounted axially against the insert 18 on the side opposite to the roller 16. In the disclosed embodiment, the roller 16 is directly mounted on the pin 14. Alternatively, a rolling bearing or a plain bearing may be radially interposed.

The tappet body 12 is made in one part. In the disclosed example, the body 12 has a tubular form. The tappet body 12 provides a cylindrical axial outer surface and a cylindrical axial inner bore or surface. The inner surface delimits a cavity 22 inside which are located the insert 18 and the pin 14. The roller 16 axially protrudes outwards with respect to an upper edge 12b of the tappet body 12. In the disclosed example, the tappet body 12 is deprived of any through-hole extending between the outer surface and the inner surface for mounting the pin 14.

The insert 18 is made in one part. The insert 18 may preferably be made of metal, by example steel, or be made of plastic material. The insert 18 is distinct from the tappet body 12. In the disclosed example, the insert 18 is entirely housed inside the cavity 22 delimited by the tappet body 12.

The insert 18 provides a base part or a central core 24 and two side parts or lateral tabs 26, 28 extending from the core and facing each other. The tabs 26, 28 of the insert extend from the core 24 towards the upper edge 12b of the tappet body. The insert 18 has in cross-section a U-shape. The roller 16 is disposed between the tabs 26, 28. A concave recess 30, 32 is provided at the free end of each tab to receive the pin 14. Both recesses 30, 32 extend through the tabs 26, 28 along the axis 14a and have the same diameter. Recesses 30, 32 form receiving housings adapted to receive the ends of the pin 14. Each end of the pin 14 is supported by one of the two tabs 26, 28. The pin 14 is supported by the insert 18.

The tappet body 12 further provides means 34, 36 for axially blocking the pin 14 and the roller 16 relative to the body. The axial blocking means 34, 36 block the translation of pin 14 in a direction from a lower edge 12c of the tappet towards the upper edge 12b. The axial blocking means 34, 36 are integrally formed with the tappet body 12. In the illustrated example, these means 34, 36 are provided on the inner surface of the tappet body at the upper edge 12b. The axial blocking means 34, 36 delimit receiving housings each facing one of the receiving housings 30, 32 of the insert to delimit together cylindrical bores for the ends of the pin 14. Alternatively, it could be possible to provide a spacer comprising cylindrical through-holes made into the thickness of the lateral tabs and facing one another, the ends of the pin 14 being fixed in the through-holes. In the illustrated example, the tappet body 12 is made from synthetic material, such as polyamide for example. The tappet body 12 is advantageously formed by moulding. Alternatively, the tappet body 12 may be made of metal, for example in an economic way by cutting, stamping and folding.

The tappet body 12 also provides two pairs of two axial ribs (not shown) provided on the inner surface of the body and which radially protrude inwards. The ribs of each pair extend axially one the axial blocking means 34, 36. The ribs of each pair are spaced apart one relative to another to delimit a space into which is located one of the tabs 26, 28 of the insert. Accordingly, each tab 26, 28 is located circumferentially between the two ribs of one pair. The ribs cooperate with the tabs 26, 28 to prevent the insert 18 from moving in the circumferential direction relative to the tappet body 12.

The device 10 further provides an annular retaining washer 40 housed inside the cavity 22 delimited by the tappet body 12 and mounted into axial contact with the insert 18. The washer 40 enables to retain the unit formed by the insert 18, the pin 14 and the roller 16 into the tappet body 12. The washer 40 axially abuts against the insert 18 axially on the side opposite to the roller 14 and the pin 16. The washer 40 axially abuts against the core 24 of the insert. In the disclosed example, the washer 40 is an elastic washer, for instance a wavy washer, in order to exert a permanent axial preload on the insert 18. Alternatively, a flat washer may be provided. The washer 40 may be open in the circumferential direction.

A plurality of protrusions 42 are formed on the inner surface of the tappet body 12 and extends radially inwards to axially block the washer 40 into the body. The protrusions 42 are integrally formed with the tappet body 12. The protrusions 42 are regularly spaced apart in the circumferential direction. The washer 40 is in axial contact against the insert 18 on one side and in axial contact with the protrusions 42 of the tappet body on the other side. Alternatively, an annular protrusion may be provided on the inner surface of the tappet body 12.

In this example, the insert 18 is supported by the tappet body 12 with the aid of the washer 40. Alternatively, the insert 18 may be supported directly by the tappet body 12, without interposition of a washer, for example by forming radial protrusions on the inner surface of the tappet body which cooperate with the insert.

The spacer 20 axially bears against the insert 18 on the side opposite to the roller 16 and the pin 14. The spacer 20 axially bears against the core 24 of the insert. The spacer 20 extends into the cavity 22 delimited by the tappet body 12 and protrudes axially outwards with respect to the lower edge 12c of the body. The lower edge 12c and the upper edge 12 delimit axially the tappet body 12.

The spacer 20 provides a main body 44 provided with an upper frontal radial surface 44a in axial contact with the insert 18, and more precisely with the core 24 of the insert. The upper radial surface 44a is mounted axially against a lower radial surface of the core 24. The body 44 also provides a lower radial frontal surface 44b intended to come into contact with a movable element (not shown), such as a piston of a fuel injection pump. In the disclosed example, the body 44 has substantially a cylindrical form. Alternatively, the body 44 may have different shape, for example a U-shape. In another variant, the spacer 20 may further provide an insert partly overmoulded into the main body 44 and delimiting the frontal surface intended to come into contact with the piston of a fuel injection pump.

The spacer 20 further provides lugs 46, 48 extending axially from the body 44 towards the pin 14 and the roller 16. Each lug 46, 48 extends axially from the upper frontal radial surface 44a of the body. Each lug 46, 48 protrudes axially with respect to the frontal radial surface 44a. Each lug 46, 48 extends through a space delimited radially between a flat side of the core 24 of the spacer and the washer 40. In the disclosed example, the spacer provides two lugs. Alternatively, it could be possible to foresee three or more lugs.

Each lug 46, 48 is provided with a hook 50, 52 in order to form axial retaining means of the spacer relative to the insert 18. Each hook 50, 52 extends radially inwards the associated lug 46, 48. Each hook 50, 52 protrudes radially from the upper end of associated lug 46, 48. Each hook 50, 52 axially faces an upper surface of the core 24 of the insert. A slight axial gap may be provided between each hook 50, 52 and the core 24. Alternatively, each hook 50, 52 may axially bear against the insert 18. Each hook 50, 52 is axially disposed on the side opposite to the body 44 of the spacer with respect to the core 24 of the insert. Each hook 50, 52 is axially disposed on the side of the roller 16 and the pin 14 with respect to the core 24.

The spacer 20 may preferably be made of plastic material, for instance PA 6.6, or be made of metallic material such as aluminium. In the disclosed example, the spacer 20 is formed in one part by moulding. Preferably, the density of the material of the body 44 of the spacer is smaller than that of the material of the tappet body 12 in order to limit the weight of the device 10. In the disclosed example, the spacer 20 is made in one part. Alternatively, the spacer 20 may provide two or more parts.

The device 10 is assembled as follows. In a first step, the insert 18, the pin 14 and the roller 16 are introduced inside the tappet body 12. The insert 18 is introduced from the lower edge 12c until the pin 14 axially bears against the blocking means 34, 36. In a second step, the spacer 20 is secured to the insert 18 with a simple axial pushing movement. The lugs 46, 48 are elastically deformable in radial direction to enable the clipping of the spacer 20 on the insert 18. The lugs 46, 48 enable to axially retain the spacer relative to the insert 18.

Figure 4:
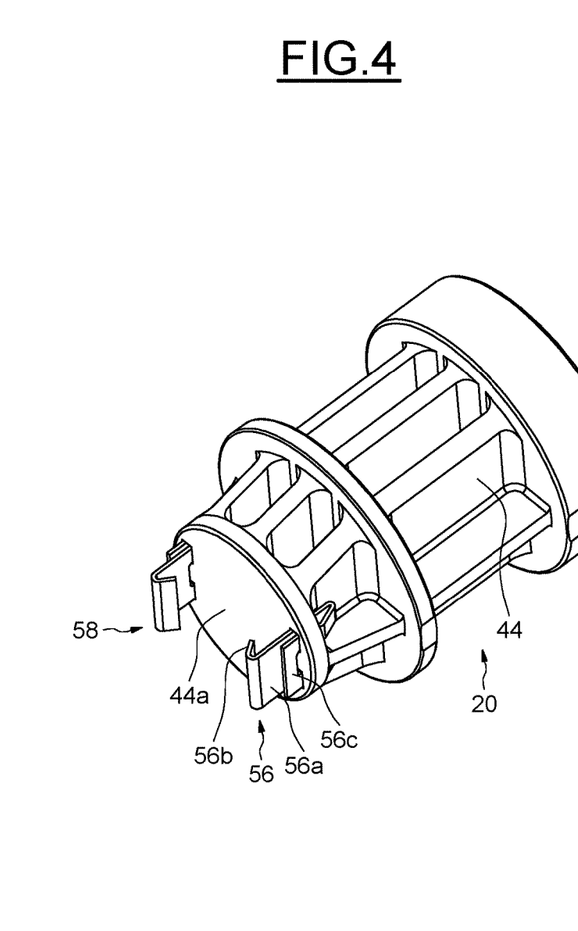
FIG. 4 is a perspective view of a spacer of a cam follower roller device according to a second example of the invention.

In the first disclosed example, the lugs 46, 48 provided with the hooks 50, 52 and the body 12 are formed in one part. In the second example illustrated on FIG. 4, in which identical parts are given identical references, the spacer 20 only differs in that two separate clips 56, 58 are secured to the body 44. Each clip 56, 58 axially protrudes with respect to the upper frontal radial surface 44a of the body. Each clip 56, 58 is inserted into a through-hole (not referenced) formed on the radial surface 44a of the body. Each of the clips 56, 58 may be made by folding and cutting a metal sheet blank. Since the two clips 56, 58 are identical in this example, only one of them will be described here.

Figure 5:
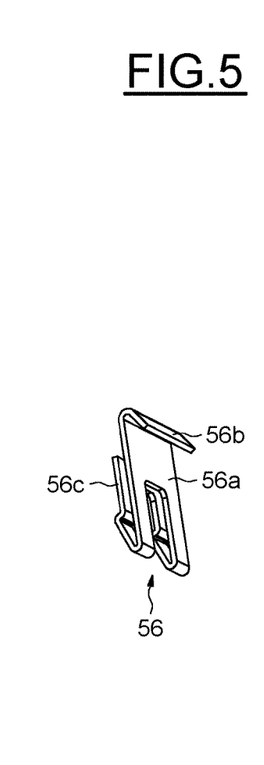
FIG. 5 is a perspective view of a clip of the spacer of FIG. 4.

As shown more clearly on FIG. 5, the clip 56 is made in one part. The clip 56 provides a lug 56a protruding with respect to the upper frontal radial surface 44a of the body (FIG. 4) and provided with a bended hook 56b. The hook 56b extends the lug 56a towards the radial surface 44a of the body. The hook 56b extends the upper end of the lug 56a. The clip 56 also provides a wing 56c extending the lower end of the lug 56a and designed to secure the clip and the spacer 20.

Figure 6:
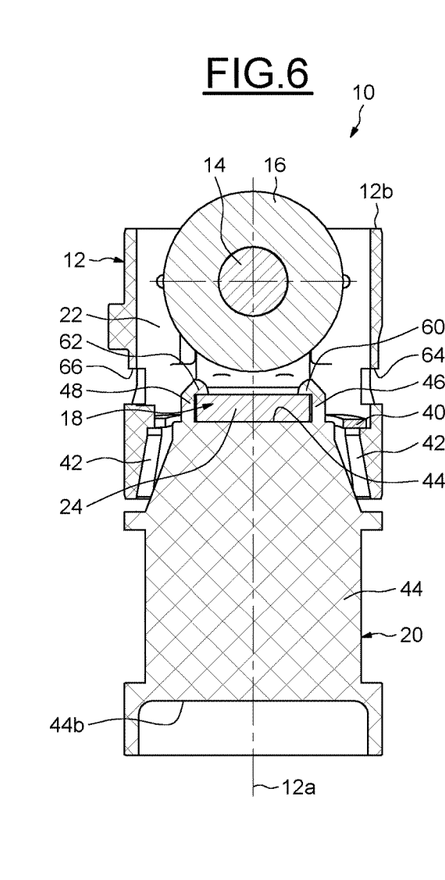
FIG. 6 is a cross-section of a cam follower roller device according to a third example of the invention.

The third example illustrated on FIG. 6, in which identical parts are given identical references, differs from the first example in that each lug 46, 48 of the spacer provides a hook 60, 62 obtained by local plastic deformation of the lug. Each hook 60, 62 extends radially the associated lug 46, 48. Each hook 60, 62 is provided at the free end of the associated lug 46, 48. Each hook 60, 62 axially bears against the upper surface of the core 24 of the insert. In this example, two through-holes 64, 66 are formed into the thickness of the tappet body 12 on each side for tool insertion.

The device 10 is assembled as follows. In a first step, the insert 18, the pin 14 and the roller 16 are introduced inside the tappet body 12. In a second step, the spacer 20 is mounted in axial contact against the insert 18. At this step, the lugs 46, 48 of the spacer are deprived of hooks as illustrated on FIG. 7.

Figure 7:
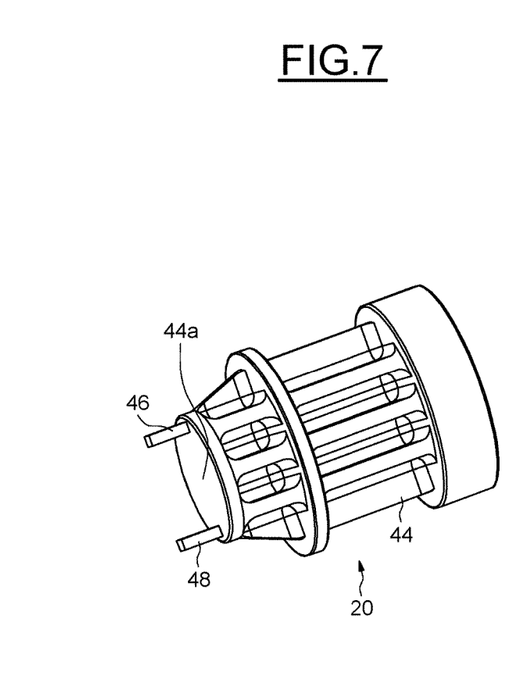
FIG. 7 is a perspective view of a spacer of the device of FIG. 6 before a deformation step.

Then, in a third step, each hook 60, 62 is formed by plastic deformation of the free end of the associated lug 46, 48. The deformation is achieved by upsetting some of the material of each lug 46, 48 in order to cause the material to creep axially against the insert 18 and radially outwards. Thus causes an interference in shape preventing the spacer 20 from moving axially with respect to the insert 18. The deformation is obtained by radial pushing with a tool inserted into the through-holes 64, 66 of the tappet body. Each hook 60, 62 may be formed by hot-riveting or by ultrasonic bonding.

Figure 8:
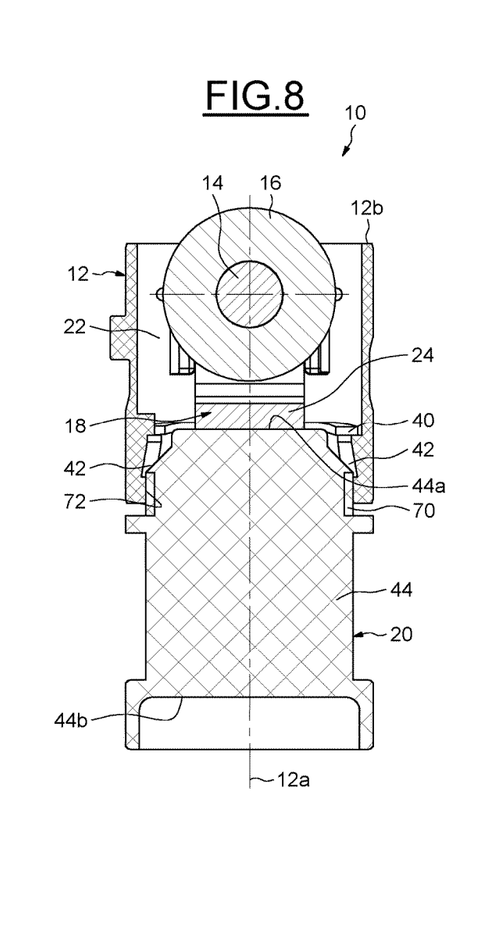
FIG. 8 is a cross-section of a cam follower roller device according to a fourth example of the invention.
Figure 9:
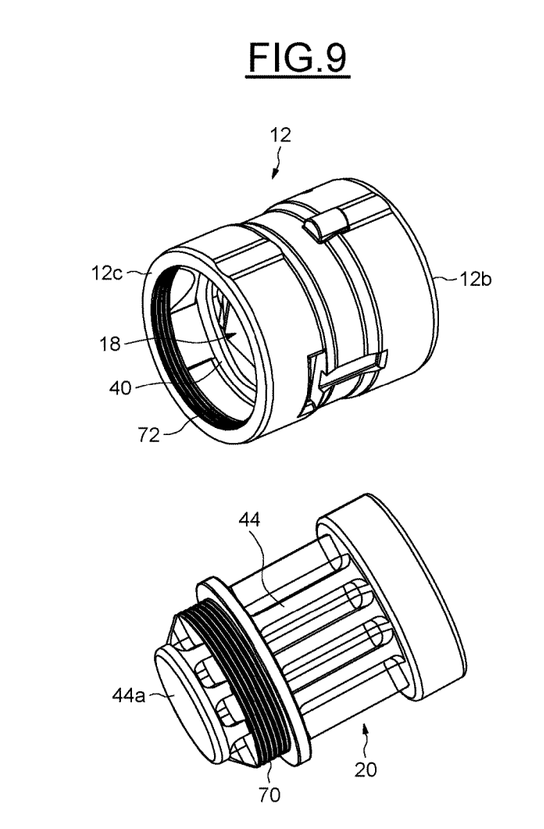
FIG. 9 is an exploded perspective view of the device of FIG. 8.

In the previous examples, the axial retention of the spacer 20 is obtained by cooperation with the insert 18 in order to obtain a single unit. In the fourth example illustrated on FIGS. 8 and 9, in which identical parts are given identical references, the body 44 of the spacer provides an outer thread 70 formed on its outer surface and meshing with an inner thread 72 formed on the inner surface of the tappet body 12, here near to the lower edge 12c of the tappet body. In this example, the spacer 20 is secured to the tappet body 12. Similarly to the previous examples, the spacer 20 axially bears against the insert 18.

The invention claimed is:

1. A cam follower roller device comprising:
   a tappet body extending along an axis,
   an insert mounted in the tappet body,
   a pin mounted at least on the insert,
   a roller mounted on the pin, and
   a spacer provided with a body mounted axially against the insert and with retaining means configured to engage with the insert or the tappet body, for fixing the spacer to the insert or tappet body,
   and wherein the density of the material of the body of the spacer is less than that of the material of the tappet body.

2. The device according to claim 1, wherein the body of the spacer is mounted axially against the insert on a side opposite to the pin and the roller.

3. The device according to claim 1, wherein the spacer axially protrudes outwards with respect to the tappet body.

4. The device according to claim 1, wherein the body of the spacer comprises an abutment surface mounted axially against the insert, the retaining means is configured to axially protrude with respect to the abutment surface.

5. The device according to claim 1, wherein the retaining means of the body of the spacer are formed on an outer surface of the body.

6. The device according to claim 5, wherein the retaining means comprises an outer thread cooperating with an inner thread formed on an inner surface of the tappet body.

7. The device according to claim 1, wherein the body of the spacer and the retaining means are formed in one part.

8. A cam follower roller device comprising:
   a tappet body extending along an axis,
   an insert mounted in the tappet body,
   a pin mounted at least on the insert,
   a roller mounted on the pin, and
   a spacer provided with a body mounted axially against the insert and with retaining means configured to engage with the insert or the tappet body, for fixing the spacer to the insert or tappet body, wherein the body of the spacer comprises an abutment surface mounted axially against the insert, the retaining means is configured to axially protrude with respect to the abutment surface, the retaining means is configured to comprise a lug provided with a hook axially disposed on a side opposite to the abutment surface with respect to the insert.

9. The device according to claim 8, wherein the hook is obtained by plastic deformation.

10. A cam follower roller device comprising:
a tappet body extending along an axis,
an insert mounted in the tappet body,
a pin mounted at least on the insert,
a roller mounted on the pin, and
a spacer provided with a body mounted axially against the insert and with retaining means configured to engage with the insert or the tappet body, for fixing the spacer to the insert or tappet body, and
a washer secured into the tappet body and mounted axially against the insert on a side opposite to the pin and the roller.

* * * * *